June 9, 1964 K. C. D. HICKMAN 3,136,707
PHASE SEPARATION BARRIER DISTILLATION APPARATUS
Filed June 7, 1957 3 Sheets-Sheet 1
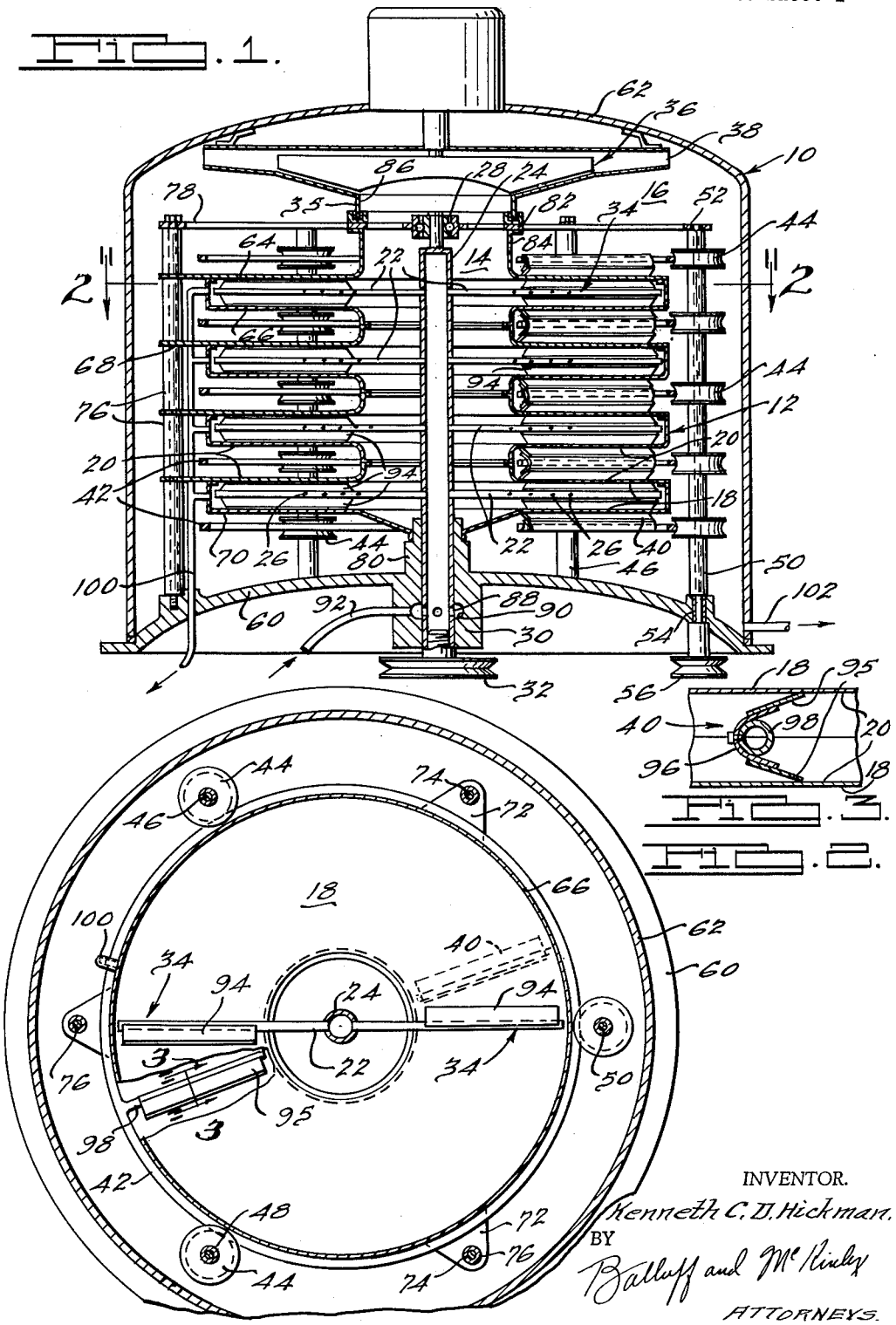
INVENTOR.
Kenneth C. D. Hickman,
BY
Balluff and McKinley
ATTORNEYS.

June 9, 1964  K. C. D. HICKMAN  3,136,707
PHASE SEPARATION BARRIER DISTILLATION APPARATUS
Filed June 7, 1957  3 Sheets-Sheet 2
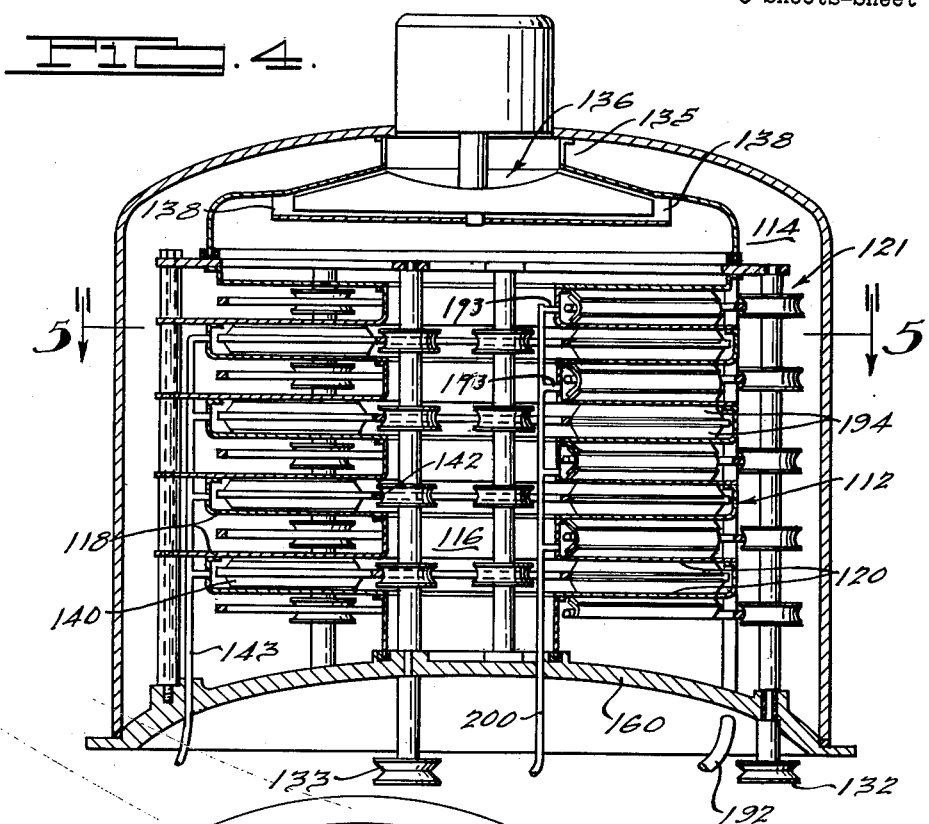
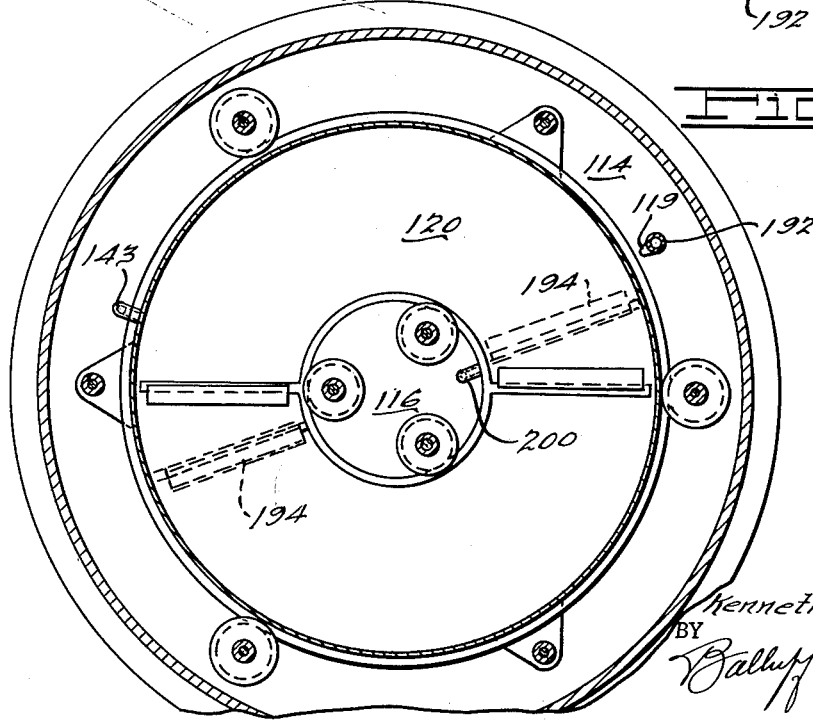
INVENTOR.
Kenneth C. D. Hickman.
BY
Balluff and McKinley
ATTORNEYS.

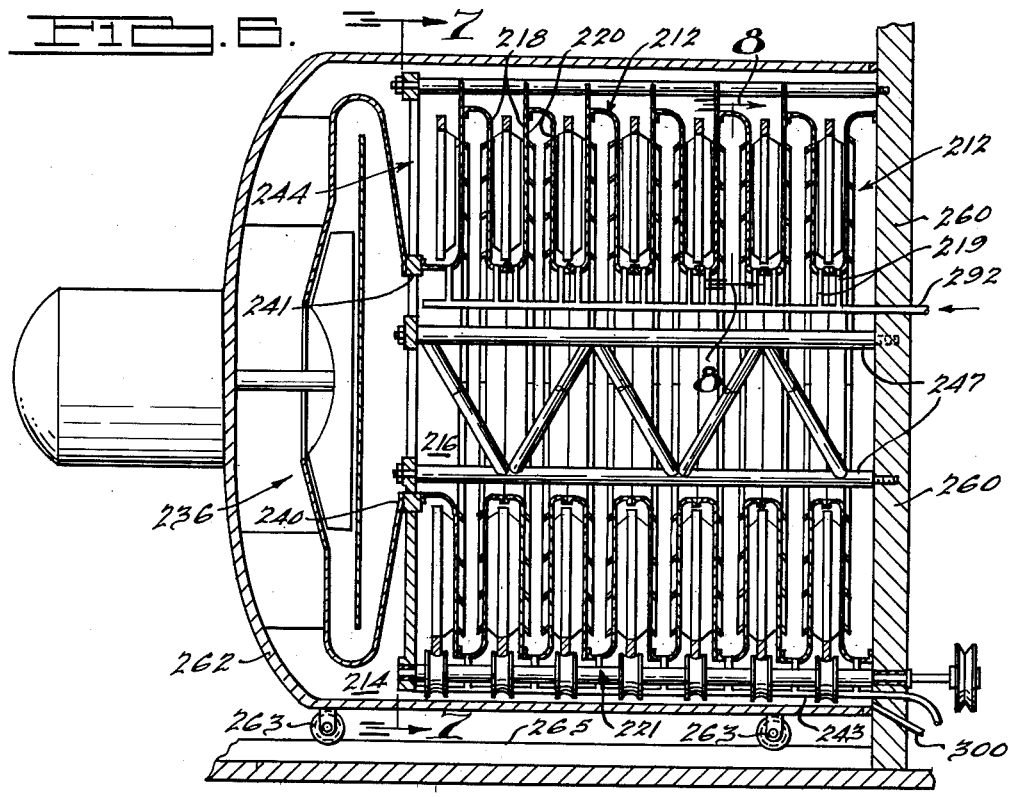
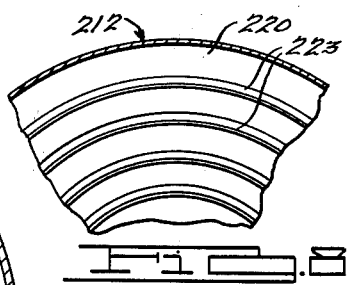
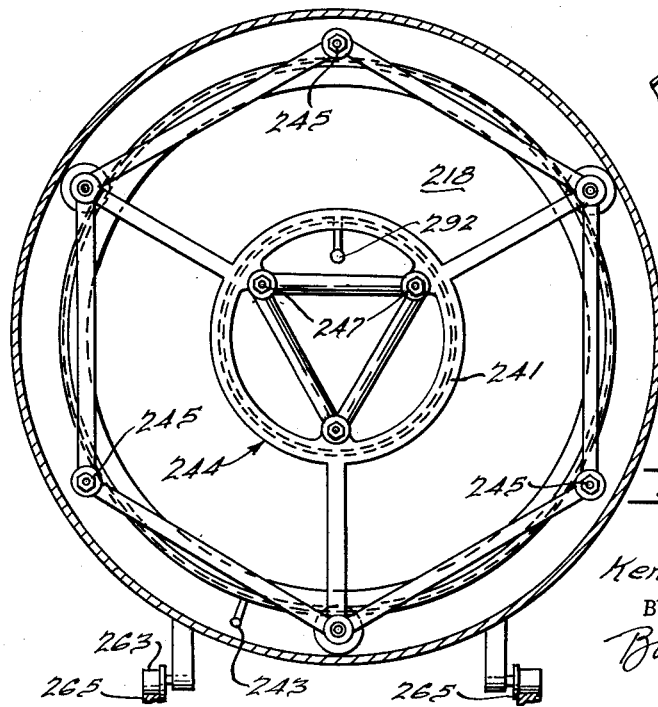

United States Patent Office 3,136,707
Patented June 9, 1964

3,136,707
PHASE SEPARATION BARRIER DISTILLATION APPARATUS
Kenneth C. D. Hickman, 136 Pelham Road, Rochester 4, N.Y.
Filed June 7, 1957, Ser. No. 664,332
13 Claims. (Cl. 202—236)

This invention relates to stills and has particular reference to certain new and useful improvements in compression stills.

Evaporation and condensation of liquids are aided by induced agitation at the liquid-vapor interface, and gravity and centrifugal force have been utilized to hasten the flow of liquid across a heat transfer surface and thus agitate the interfaces. Brushes and scrapers have been proposed to wipe the evaporating surface while liquid is fed thereon, as in Testrup U.S. Patent No. 1,501,515. In compression stills where evaporation and condensation occur on the two sides of a single heat transfer and phase separation barrier, centrifugal agitation has been employed, as in my earlier U.S. Letters Patent No. 2,734,023.

An object of the present invention is to provide an improved still in which the distilland on the evaporating surface of a stationary heat transfer and phase separation barrier is forcibly spread and flowed over such surface so as to yield a liquid film exhibiting an average thermal conductivity substantially greater than that exhibited by a film of the same distilland flowing at the same throughput on the same surface under the influence of gravity alone.

Another object of the invention is to provide an improved still having a stationary heat transfer and phase separation barrier in which provision is made for effecting the separation of condensate from the condensing surface, preferably to prevent the accumulation of condensate on the condensing surface in a film thicker than the film of distilland on the evaporating surface of the barrier.

A further object of the invention is to apply liquid spreading and removal means to stationary surfaces which have been manifolded in order to pack a large operating surface into a relatively small volume.

The present invention affords significant advantages in the construction, operation and maintenance of large stills and overcomes balancing and related problems that beset certain varieties of rotary barrier compression stills of the type disclosed in my Patent No. 2,734,023.

Other and further objects of the invention will be apparent from the following description and claims and may be understood by reference to the accompanying drawings, of which there are three sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

FIG. 1 is a vertical sectional view of a recompression still embodying the invention;

FIG. 2 is a sectional view taken along the line 2—2 of FIG. 1 with certain parts broken away;

FIG. 3 is a fragmentary sectional view taken along the line 3—3 of FIG. 2;

FIG. 4 is a vertical sectional view of a modified form of the invention;

FIG. 5 is a horizontal sectional view taken along the line 5—5 of FIG. 4;

FIG. 6 is a vertical sectional view illustrating a further modified form of the invention;

FIG. 7 is a sectional view taken along the line 7—7 of FIG. 6; and

FIG. 8 is a fragmentary sectional view taken along the line 8—8 of FIG. 6.

The compression still shown in FIG. 1 comprises in general a pressure-tight housing 10 the inside of which is divided by a stationary manifolded heat exchanger and phase separation barrier 12 into an evaporating chamber 14 and a condensing chamber 16. The inside of the barrier 12 provides a plurality of annular, generally parallel evaporating surfaces 18 arranged in pairs, while the outside of the barrier 12 provides a plurality of annular, generally parallel condensing surfaces 20 also arranged in pairs, and the evaporating surfaces on one side of the barrier are in heat transfer relationship through the barrier with the condensing surfaces on the opposite side thereof. The barrier preferably is constructed of thin sheet metal of high thermal conductivity, such as copper, cupro-nickel, silver or aluminum. For some applications metals of lesser conductivity may be employed, including stainless steel, tantalum, or titanium by way of example.

Means are provided for continuously supplying and applying distilland to the evaporating surfaces at a rate in excess of that required to wet such surfaces, and such means comprise a series of feed pipes 22 which project radially from a rotating axially disposed feed pipe 24, each of the pipes 22 being provided with a series of orifices 26 for discharging distilland onto the evaporating surfaces adjacent the inner edge thereof. The feed pipes 22 may be provided with rows of orifices which will deliver relatively high velocity jets of distilland, and in addition the pipes may carry impellers or scrapers 34. The rotating feed pipe 24 is journalled in an upper bearing 28 and in a lower bearing 30, and below the bearing 30 is provided with a pulley 32 by means of which it may be rotated at an appropriate speed so that feed pipes with or without the impellers 34 will spread and flow the distilland discharged through the orifices 26 onto the evaporating surfaces 18 to yield a liquid film exhibiting an average thermal conductivity substantially greater than exhibited by a film of distilland flowing at the same throughput over the same surfaces under the influence of gravity alone. Preferably the feed pipes 22 and 24 and the impellers 34, if also used, hereinafter referred to as a rotary structure or as a distilland spreading and flowing means, are continuously rotated at such a speed that the flowing film of distilland will conduct heat as well as a film of such distilland flowing undisturbed with the same throughput on the same surface under the influence of a force ten or more times gravity.

The evaporating chamber 14 communicates with the intake 35 of a motor driven rotary compressor 36, the outlet 38 of which is in communication with the condensing chamber 16. The compressor 36 forms a pump or means for continuously withdrawing from the evaporating chamber 14 vapor evolved from the flowing film of distilland, for compressing such vapor and for directing compressed vapor into intimate contact with the condensing surfaces 20 so as to condense such vapor thereon, thereby to transfer the heat of condensation to the flowing film on the evaporating surfaces 18 to effect the evolution of vapor therefrom. The compressor 36 compresses the vapor sufficiently so that it will condense at a sufficiently high temperature above that at which it is evolved so that the heat of condensation will provide the heat to effect the evolution of vapor from the flowing film of distilland on the evaporating side of the heat exchanger 12.

A rotary structure is also provided for continuously separating the condensate from the condensing surfaces as it condenses thereon so as to prevent the accumulation of condensate on the condensing surfaces and to maintain such condensate on the condensing surfaces in a film with substantially better thermal conductivity than a film of such condensate of the same throughput on the same surface flowing under the influence of gravity alone. For most efficient operation the rotary structure for effecting the flow of condensate from the condensing surfaces should maintain the film of condensate on the condensing surfaces with an average thickness less than the average thickness of the film of distilland on the evaporating surfaces.

The rotary structure for effecting the flow of condensate from the condensing surfaces comprises a plurality of impellers 40 carried by a series of rings 42 which are rotatably supported by a series of rotatably mounted, peripherally grooved wheels 44, each ring 42 being supported by three grooved wheels 44. The wheels 44 are carried by shafts 46, 48 and 50, shaft 50 being rotatably journalled in bearings 52 and 54 and provided with a pulley 56 at its lower end so that it may be rotated at an appropriate speed for effecting flow of condensate from the condensing surfaces as previously described. Except for the condensing surfaces 20 at the ends of the barrier 12, the condensing surfaces 20, like the evaporating surfaces 18, are arranged in pairs and all are substantially parallel to each other and disposed in planes within 5–10° of normal to the axis of rotation of the rotary feed pipe 24 and the rings 42.

The casing or housing 10 comprises a base 60 and a bell-shaped housing member 62 seated on and sealed to the periphery of the base 60. The barrier 12 comprises a stack of disc-shaped spinnings or stampings 64, 66, 68 and 70, the intermediate members 66 being identical with each other, and the intermediate members 68 being identical with each other. The members 64, 66, 68 and 70 are stacked as illustrated to form the barrier 12. The meeting edges of such members are formed so as to seat one upon the other, and such meeting edges may be welded or soldered together so as to form a pressure-tight joint, although I contemplate that the meeting edges at the inner periphery between the members 66 and 68 may be gasketed without soldering or welding so that the barrier 12 may be easily formed by stacking a series of such members together.

The members 64 and 68 preferably are provided with apertured ears 72. Each of the members 64 and 68 is provided with three ears 72, and such ears are aligned so that a rod 74 may be passed therethrough. Between adjacent ears 72 spacing members 76 are mounted on the rods 74. At their upper ends the rods 74 are bolted to a spider 78, and at their lower ends the rods are anchored to the base 60. Thus the rods 74 with the spider 78 and the spacing members 76 provide a means for clamping the members which form the barrier 12 together, and the barrier on the base.

At its lower end the member 70 is shaped to seat on and be sealed to the boss 80 on the base 60 in which the bearing 30 is provided. At its upper end the member 64 of the barrier 12 seats against the inner ring section 82 of the spider 78. The joint between the inner ring section 82 and the neck of the member 64 may be gasketed. The neck 84 of the member 64, along with the inner ring section 82, defines the inlet 35 to the compressor 36, the shroud of which is provided with an annular collar 86 the rim of which seats in an annular sealing gasket which in turn is seated in an annular channel in the upper surface of the ring section 82. The compressor 36 and its driving motor are mounted on housing member 62, and when housing member 62 is lifted from base 60, the collar 86 of the compressor shroud readily separates from ring section 82.

The bearing 28 for the rotary feed pipe 24 and the upper bearing 52 for the rotary shaft 50 are provided by or mounted on the spider 78. The lower end of the rotary feed pipe 24 is provided with a series of holes 88 which afford communication between the interior of the pipe 24 and an annular chamber 90 with which a supply pipe 92 communicates so that distilland may be fed upwardly through the feed pipe 24 and into each of the feed pipes 22 which project radially therefrom. Two oppositely disposed feed pipes 22 extend between each pair of evaporating surfaces 18, and the orifices 26 are disposed so as to discharge the distilland against the surfaces 18 adjacent the inner periphery thereof. The feed pipes provide arms for carrying the blades 94 of impellers 34, the trailing edges of such blades 94 being adapted to spread and flow the distilland on the evaporating surfaces 18 when the feed pipe 24 is rotated. The blades 94 may be like the blades 95 of impellers 40 shown in FIG. 3. Preferably the trailing edges of the blades 94 are arranged so as to sweep the distilland over the evaporating surfaces 18. The trailing edges of such blades 94 may be arranged to lightly contact and engage the evaporating surfaces 18 or to be closely spaced with respect to such surfaces so that there is no actual contact between the blades 94 and the surfaces 18, and in any event the arrangement is such that the blades 94 will spread and flow the distilland in a thin film as previously described.

Each impeller 40 comprises a pair of blades 95 carried by a U-shaped spring member 96 affixed to an arm 98 which projects inwardly from the ring 42, the arrangement of the blades 95 preferably being such that the leading edges of the blades 95 will peel or skim the condensate from the condensing surfaces 20 so as to prevent the accumulation of condensate on the condensing surfaces 20 as previously described. The blades 95 and 94 may be formed of thin flexible rubber or any other suitable material, and the pipes 22 which carry the blades 94 and the arms 98 which carry the blades 95 may be flexible or flexibly mounted if required to obtain the desired cooperation between the blades 95 and 94 and the surfaces 20 and 18 respectively.

As shown, the impellers 34 and 40 are rotated in opposite directions so that the blades 94 will sweep the distilland over the evaporating surfaces 18, and the blades 95 of the impellers 40 will peel or skim the condensate from the condensing surfaces 20. The blades 94 and 95 may be arranged so that the impellers 34 and 40 both turn in the same direction, and may be otherwise disposed with respect to their respective surfaces than as illustrated, and some or all of the blades may not physically engage the heat exchange surfaces. Other types of impellers may be employed to effect the spreading and flowing of the distilland on the evaporating surfaces and the removal of the condensate from the condensing surfaces. Preferably the liquid layers or both surfaces of the heat exchanger and phase separation barrier 12 are rapidly and continuously disturbed by the impellers during still operation. Such impellers may comprise liquid and/or fluid jets, brushes, scrapers or wipers, and/or combinations thereof.

A manifold 100 communicates with the spaces between each pair of evaporating surfaces 18 at the outer periphery thereof so as to withdraw the residue from the evaporating chamber 14, the impellers or blades 94 serving to sweep the residue to the outer periphery of the evaporating surfaces 18 and through the passages leading to the manifold 100. A plurality of such manifolds 100 may be provided.

The compression still as disclosed is particularly adapted for continuous operation for recovering potable water from sea or brackish or waste waters, although it may be used for distilling other liquids. I contemplate that the still may operate at various selected temperature and pressure levels, and may be used for concentrating solutions as well as for recovering fractions from the input thereto. A withdrawal pipe 102 is provided for withdrawing the condensate or distillate from the condensing chamber 16. Preferably the compression still herein disclosed may have associated with it a suitable degassing and purging system, such for example as that disclosed in my Patent No. 2,899,366, issued August 11, 1959, for "Compression Distillation." In addition, suitable heat exchangers may be provided for transferring heat from the residue discharged through the manifold 100 and the distillate discharged through the conduit 102 to the input supplied through the pipe 92.

The design of the stationary barrier 12 not only facilitates the construction and assembly thereof, but also provides a relatively large heat exchange surface for a given volume. The mass of the rotary structure on the evaporating side, as well as that on the condensing side, is such as to minimize the serious balancing problems inherent in large rotary barrier stills of the construction disclosed in my Patent No. 2,734,023. The rotary structure on the condensing side may be operated at the same speed as the rotary structure on the evaporating side, although I contemplate that it may be operated at a lower or a higher speed, depending upon the purpose for which the still is being employed. In addition to spreading and flowing the distilland on the evaporating surfaces, the high speed rotation of the rotary structure on the evaporating side serves to minimize and/or substantially eliminate scale formation on the evaporating surfaces.

In the construction shown in FIGS. 1, 2 and 3, the inside of the barrier 12 forms the evaporating chamber and the outside of the condensing chamber, whereas in the modified construction of FIGS. 4 and 5 the converse is true. In FIGS. 4 and 5 the construction is essentially the same as that previously described except for such changes as are required in view of the fact that the evaporating surfaces and chamber 114 are on the outside of the barrier while the condensing surfaces and chamber 116 are on the inside of the barrier. Thus, in FIGS. 4 and 5 a series of stampings or spinnings are stacked and connected to form a stationary heat exchanger and phase separation barrier 112 generally in the form of a bellows providing on the outside thereof a series of annular evaporating surfaces 118, and on the inside a series of condensing surfaces 120. The construction of the barrier 112, its mounting on the base 160, and its jointure with the shroud of compressor 138 are basically the same as disclosed and described in connection with FIGS. 1–3. One end of the barirer 112 is sealed to the base 160, while the other end is sealed to the discharge side of the compressor 136 so as to divide the space within the still into the evaporating chamber 114 and the condensing chamber 116.

However, since the evaporating chamber 114 is on the outside and the condensing chamber 116 is on the inside, the motor driven compressor 136 is arranged to withdraw vapor from the chamber 114 through the inlet 135 and to discharge the same through the outlet 138 into the condensing chamber 116. Jets of distilland may be continuously supplied to the evaporating surfaces 118 by a series of nozzles 119 mounted on one or more feed pipes 192 and/or by a feed pipe 200 provided with a series of nozzles 193, and a rotary structure 121 similar to that employed on the condensing side in FIG. 1 is employed in FIGS. 4 and 5 to spread and flow the distilland on the evaporating surfaces 118 so as to obtain a film of the character previously described. In this case the impellers or blades 194 which spread and flow the distilland on the evaporating surfaces should be disposed so as to cause the distilland to flow radially outwardly across the evaporating surfaces 118 and to discharge the residue by centrifugal force into the casing from which it is removed by any suitable means. In lieu of or in addition to using impellers or blades 194, the rotary structure of all of the modifications disclosed may be constructed and arranged so as to discharge jets of liquid against the evaporating surfaces to effect the continuous disturbance of the flowing film of distilland upon operation of said rotary structure.

In the case of FIGS. 4 and 5, the rotary structure on the condensing side is essentially the same as the rotary structure on the evaporating side, except that the impellers project outwardly from their supporting ring 142. A manifold 143 communicationg with each of the spaces between the condensing surfaces at the outer periphery thereof serves to collect and remove the distillate which is centrifugally impelled toward the outer periphery by the rotation of the impellers 140. The function of the rotary structure on the condensing side in FIG. 4 is the same as that of the rotary structure disclosed in FIGS. 1–3, namely, to effect the flow of condensate from the condensing surfaces so as to separate the condensate therefrom in the manner previously described.

One of the shafts for the rotary structure 121 is provided with a pulley 132 by means of which the rotary structure on the evaporating side of the still may be operated, and similarly one of the shafts for the rotary structure on the condensing side of the still is provided with a pulley 133 by means of which the rotary structure on the condensing side of the still may be operated. Except in the particulars noted, the construction and operation of the still shown in FIGS. 4 and 5 are the same as described in connection with FIGS. 1–3.

In the modification disclosed in FIGS. 6, 7 and 8, which is a modification of the construction shown in FIGS. 4 and 5, the still and barrier 212 are constructed so that the evaporating surfaces 218 and the condensing surfaces 220 are vertically disposed. In FIGS. 6, 7 and 8 the construction of the heat exchanger and phase separation barrier 212 is essentially that disclosed in FIGS. 4 and 5 except that the axis of the still is horizontal instead of vertical. In addition, in the case of FIGS. 6, 7 and 8, the housing 262 is provided with a set of wheels 263 which are adapted to roll upon a track 265 so as to facilitate separation of the housing member 262 from the base 260 of the still. In FIGS. 6, 7 and 8 I employ the same rotary structure for spreading and flowing the distilland on the evaporating surfaces 218 as shown in FIGS. 4 and 5. In FIGS. 6, 7 and 8, however, I have omitted the rotary structure on the condensing side as shown in FIG. 4, and instead I rely upon the gravitational flow of condensate from the condensing surfaces 220.

A manifold 243 communicates with the condensing side of the barrier 212 between each pair of condensing surfaces 220 and at the bottom thereof for removing the distillate. A feed pipe 292 provided with a series of nozzles 219 is arranged to supply distilland to each of the evaporating surfaces 218 where a rotary structure indicated generally at 221 is arranged to spread and flow the distilland on the evaporating surfaces 218 in the manner previously described.

The condensing surfaces 220 may be provided with a series of annularly extending projections or ribs 223 which lead the condensate away from the condensing surfaces. The ribs also serve as added heat transfer elements and the drippings therefrom serve to desaturate the incoming steam.

In FIGS. 6, 7 and 8 the motor driven compressor 236 is carried by the outer housing member 262 and the shroud of the compressor terminates in an annular rim 240 which removably seats on and has sealing engagement with a ring section 241 provided on a spider indicated generally at 244. The spider is carried by two series of rods 245 and 247 which are anchored to the base 260 of the housing. The rods 247 may be braced as shown so as to stiffen the structure. The heat exchanger and phase separation barrier 212 at one end has sealing engagement with the ring section 241 of the spider, and at the other end has sealing engagement with the base 260 so as to separate the interior of the housing into an outer evaporating chamber 214 and an inner condensing chamber 216. A conduit 300 is provided for removing residue from the evaporating chamber 214.

Due to the absence of impellers in FIGS. 6, 7 and 8 for forcibly removing condensate from the condensing surfaces, the efficiency of the apparatus illustrated in FIGS. 6, 7 and 8 is not as great as that of the previous modification, but it may be adequate for some uses. I contemplate, however, that instead of using the ribs 223 on the condensing surfaces in FIGS. 6, 7 and 8, a rotary structure like that shown in FIGS. 4 and 5 may be employed for forcibly separating the condensate from the condensing surfaces. Except in the particulars noted, the construction and operation of the still shown in FIGS. 6, 7 and 8 are the same as those of the previous modification.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. In a still, a stationary heat exchanger and phase separation barrier forming an evaporation chamber on one side and a condensing chamber on the other side, said barrier providing on the evaporating sides thereof a plurality of annular evaporating surfaces and on the condensing side thereof a plurality of annular condensing surfaces with the evaporating surfaces on one side of said barrier and in heat transfer relationship with the condensing surfaces on the opposite side of the barrier, means for continuously applying distilland to each of said evaporating surfaces radially inwardly from the outer periphery thereof at a rate in excess of that required to wet said evaporating surfaces, a rotary structure operable to spread and flow such distilland radially outwardly on each of such evaporating surfaces in a film of substantially greater thermal conductivity than can be secured by a flow of such distilland of the same throughput on the same surface flowing under the influence of gravity alone, means for withdrawing from said evaporating chamber vapor evolved from said flowing films of distilland, said rotary structure acting on the residue for impelling the same radially outward on said evaporating surfaces so as to separate the residue from the distilland and to centrifugally discharge the residue from said evaporating surfaces, means for directing vapor to be condensed into intimate contact with said condensing surfaces so as to condense such vapor thereon and to transfer the heat of condensation thereof to said flowing films on said evaporating surfaces to effect the evolution of vapor therefrom, and provisions for effecting the flow of condensate from said condensing surfaces so as to separate said condensate therefrom.

2. A still according to claim 1 wherein said provisions comprise a rotary structure including a plurality of impellers cooperable with said condensing surfaces for removing condensate therefrom.

3. A still according to claim 1 wherein said rotary structure surrounds said barrier and comprises a series of impellers, rings on which said impellers are mounted, a series of wheels rotatably supporting each of said rings, and means for rotating said rings.

4. In a still, a stationary heat exchanger and phase separation barrier forming an evaporation chamber on one side and a condensing chamber on the other side, said barrier providing on the evaporating side thereof a plurality of annular evaporating surfaces and on the condensing side thereof a plurality of annular condensing surfaces with the evaporating surfaces on one side of said barrier and in heat transfer relationship with the condensing surfaces on the opposite side of the barrier, means for continuously applying distilland to said evaporating surfaces at a rate in excess of that required to wet said evaporating surfaces, a rotary structure for distributing said distilland on said evaporating surfaces, said rotary structure comprising a plurality of impellers operable under rotation of said structure and so disposed with respect to said evaporating surfaces as to spread and flow such distilland on each of said evaporating surfaces in a film of substantially greater thermal conductivity than can be secured by a flow of such distilland of the same throughput on the same surface flowing under the influence of gravity alone, and means for withdrawing from said evaporating chamber vapor evolved from said flowing films of distilland and for directing such vapor into intimate contact with said condensing surfaces so as to condense such vapor thereon and to transfer the heat of condensation thereof to said flowing films on said evaporating surfaces to effect the evolution of vapor therefrom.

5. A still according to claim 4 including a rotary structure for separating condensate from said condensing surfaces.

6. A still according to claim 4 wherein said barrier comprises a stack of relatively flat disc-like members.

7. A still according to claim 4 wherein said rotary structure comprises a plurality of impellers so disposed with respect to said evaporating surfaces as to effect the spreading and flowing of the distilland thereon, a series of rings on which said impellers are mounted, a series of wheelers rotatably supporting each of said rings, and means for rotating said rings.

8. In a recompression still, a stationary heat exchanger and phase separation barrier forming an evaporation chamber on one side and a condensing chamber on the other side, said barrier comprising a stack of relatively flat disc-like members providing on the evaporating side thereof a plurality of annular evaporating surfaces and on the condensing side thereof a plurality of annular condensing surfaces with the evaporating surfaces on one side of said barrier and in heat transfer relationship with the condensing surfaces on the opopsite side of the barrier, means for continuously applying distilland to said evaporating surfaces at a rate in excess of that required to wet said evaporating surfaces, rotary film disturbing means operable so as to spread and flow and maintain such distilland on each of said evaporating surfaces in a film of substantially higher thermal conductivity than can be secured by a flow of such distilland of the same throughput on the same surface flowing under the influence of gravity alone, means for withdrawing from said evaporating chamber vapor evolved from said flowing films of distilland and for directing such vapor into intimate contact with said condensing surfaces so as to condense such vapor thereon and to transfer the heat of condensation thereof to said flowing films on said evaporating surfaces to effect the evolution of vapor therefrom, and provisions for effecting the flow of condensate from said condensing surfaces so as to separate said condensate therefrom.

9. A still according to claim 8 wherein said evaporating and condensing surfaces are arranged in pairs parallel to each other and wherein said rotary film disturbing means comprises a plurality of impellers projecting between opposed evaporating surfaces and cooperable therewith for spreading and flowing such distilland.

10. In a still, a stationary heat exchanger and phase separation barrier forming an evaporation chamber on one side and another chamber on the other side, said barrier providing on the evaporating side thereof a plurality of evaporating surfaces in heat transfer relationship with the opposite side of the barrier, means for continuously applying distilland to said evaporating surfaces, rotary means for spreading and flowing said distilland in a film on each of said evaporating surfaces, means including a pump for withdrawing from said evaporating chamber vapor evolved from said films of distilland and directing such vapor after discharge from said pump into intimate contact with the opposite side of said barrier for heating the same so as to transfer heat to said films on said evaporating surfaces to effect the evolution of vapor therefrom.

11. In a still, a hollow stationary heat exchanger and phase separation barrier providing on one side thereof a series of annular evaporating surfaces and on the other side thereof a series of annular condensing surfaces in heat transfer relationship with said evaporating surfaces, and rotary means for continuously spreading distilland on said evaporating surfaces and comprising a plurality of liquid jets so disposed with respect to such evaporating surfaces as to effect the continuous disturbance of the flowing films of distilland upon operation of said rotary means.

12. A still according to claim 10 wherein said barrier comprises a stack of relatively flat disc-like members which form said evaporating surfaces and also provide condensing surfaces on said opposite side of said barrier.

13. A still according to claim 11 wherein said barrier comprises a stack of relatively flat disc-like members which form said evaporating surfaces and also provide condensing surfaces on said opposite side of said barrier.

References Cited in the file of this patent

UNITED STATES PATENTS

| | | |
|---|---|---|
| 949,719 | Schroder | Feb. 15, 1910 |
| 1,501,515 | Testrup | July 15, 1924 |
| 1,757,476 | Rennerfelt | May 6, 1930 |
| 1,831,679 | Metcalfe-Shaw | Nov. 10, 1931 |
| 1,918,385 | Engisch | July 18, 1933 |
| 1,966,938 | Stone | July 17, 1934 |
| 2,308,008 | Hickman | Jan. 12, 1943 |
| 2,349,431 | Hickman | May 23, 1944 |
| 2,403,978 | Hickman | July 16, 1946 |
| 2,460,602 | Sermon | Feb. 1, 1949 |
| 2,500,900 | Madlen | Mar. 14, 1950 |
| 2,703,310 | Kretchmar | Mar. 1, 1955 |
| 2,734,023 | Hickman | Feb. 7, 1956 |
| 2,823,742 | Ludin et al. | Feb. 18, 1958 |

FOREIGN PATENTS

| | | |
|---|---|---|
| 92 | Great Britain | 1877 |
| 100,250 | Great Britain | July 27, 1916 |
| 342,830 | Great Britain | Feb. 12, 1931 |
| 24,265 | Finland | Aug. 11, 1950 |